United States Patent [19]

Lüers et al.

[11] Patent Number: 5,609,679
[45] Date of Patent: Mar. 11, 1997

[54] POLYOL-TREATED ANTIBLOCKING AID

[75] Inventors: Georg Lüers, Westhofen; Richard Sobottka, Worms, both of Germany; Paul M. Dunn, Herts, England

[73] Assignee: W. R. Grace & Co.-Conn., New York, N.Y.

[21] Appl. No.: 486,417

[22] Filed: Jun. 7, 1995

[30] Foreign Application Priority Data

Jan. 19, 1995 [DE] Germany .................. 195 02 629.2

[51] Int. Cl.$^6$ .................................................. C04B 14/04
[52] U.S. Cl. .................. 106/491; 106/251; 106/266; 106/287.26; 106/287.34; 252/28; 252/315.2; 252/315.6; 501/54; 501/55; 501/154; 523/200; 508/136
[58] Field of Search ................ 106/287.34, 491, 106/287.26, 251, 266; 501/54, 55, 154; 523/200, 275; 252/28, 315.2, 315.6

[56] References Cited

U.S. PATENT DOCUMENTS

| | | | |
|---|---|---|---|
| 4,629,749 | 12/1986 | Kitchel et al. | 523/200 |
| 4,675,122 | 6/1987 | Luers et al. | 252/28 |
| 5,221,337 | 6/1993 | Luers et al. | 106/266 |
| 5,298,234 | 3/1994 | Nakazawa et al. | 501/68 |
| 5,366,645 | 11/1994 | Sobottka | 252/28 |

FOREIGN PATENT DOCUMENTS

| | | |
|---|---|---|
| 0526117 | 2/1993 | European Pat. Off. |
| 2484428 | 12/1981 | France |
| 255750 | 2/1990 | Japan |

*Primary Examiner*—Mark L. Bell
*Assistant Examiner*—Scott L. Hertzog
*Attorney, Agent, or Firm*—Steven Capella

[57] ABSTRACT

The use of a composition based on silicon dioxide as antiblocking agent is described which is characterized in that it has silicon dioxide having a particle size of 2 to 8 μm, a specific surface of 150 to 850 m$^2$/g and a specific pore volume of 1.4 to 2.0 ml/g which has been treated with polyol. This silicon dioxide can be used together with a slip agent as combined antiblocking agent and slip agent. The working-in of the antiblocking agent or of the combined antiblocking agent and slip agent into a polymer is preferably in the form of a masterbatch. A preferred antiblocking agent contains as polyol ethoxylated pentaerythritol in which the pentaerythritol/ethoxy ratio lies in the range from 1:0.5 to 1:25. The antiblocking agent can be obtained by micronizing silicon dioxide to the given particle size and impregnating it with the polyol.

17 Claims, 7 Drawing Sheets

POLYOL-TREATED ANTIBLOCKING AID

BACKGROUND OF THE INVENTION

The invention relates to the use of a composition based on polyol-treated silicon dioxide as antiblocking agent, to an antiblocking agent and to a process for its production.

Micronized silicic acid gels are used to a large extent as antiblocking agents in polymer films. Synthetic amorphous silica gels have a relatively large specific pore volume (usually called porosity) and accordingly supply a larger number of particles (of a certain size) per gram than products having a smaller porosity (e.g. talc, chalk, natural silica gels such as diatomaceous earth). When these particles, which generally have diameters between 1 and 10 μm (Coulter Counter), are incorporated into polymer films in concentrations in the order of magnitude of 0.1%, they produce microscopic surface deformations which prevent complete contact of film layers lying on one another and make the separation of the film layers from one another (for example in the case of carrier bags) or unwinding of the film rolls easier. This is the "antiblocking" effect. For the above reasons, micronized synthetic silica gels are more effective antiblocking agents than products having a low or no porosity. The specific surface of products is linked to their porosity: a very low porosity (almost zero) corresponds to a very small specific surface (less than 1 $m^2/g$).

In many cases, a slip agent is additionally added to the antiblocking agent in polymer films. In most cases the slip agent is a fatty acid amide such as oleic acid amide or erucic acid amide and makes the slipping of the film layers over one another easier (slipping effect). However, the antiblocking agent present reduces the effectiveness of the slip agent because the surface of the antiblocking agent is polar and the polar amide molecules are adsorbed on it. As a result, some of the slip agent is not available on the film surface where it is required for the desired slipping effect. Natural products have a very small surface of 0.1 to 0.5 $m^2/g$, compared with synthetic $SiO_2$ products having a surface of 300 to 600 $m^2/g$. They adsorb less slip agent than for example silica gel, but show only a very small antiblocking effect because of the low porosity and the small surface.

The antiblocking effect of synthetic silica gels is almost three times greater than that of products with a small surface, but unfortunately, synthetic silica gels adsorb slip agents. This means that, in order to achieve the desired antiblocking and slipping properties, a polyolefin film has for example to be supplied with 0.3 wt. % of an antiblocking agent having a small surface and 0.1 wt. % slip agent, or with 0.1 wt. % antiblocking agent made from synthetic silicic acid and 0.15 wt. % slip agent. This shows that the effectiveness of the slip agent in the presence of synthetic silicic acid is considerably reduced, i.e. approximately 50% more slip agent is required in order to obtain the same slipping effect or the same low coefficient of friction.

Thus, although the traditional synthetic silicic acids are highly effective antiblocking agents, the adsorption of slip agent represents a problem, because a) it makes it difficult to predict the effect of the slip agent in the film which can ultimately be achieved, b) the higher quantity of slip agent increases the costs of film manufacture and c) the required higher quantity of slip agent increases the extractable quantity of organic constituents, which is of importance as regards approval of the film for the packing of foods.

Described in U.S. Pat. No. 4,629,749 is the use of polyethylene glycol (PEG) together with antiblocking agents such as diatomaceous earth for improving the clarity of a blown film. Because of their small specific surface and their small pore volume, diatomaceous earths are not very efficient as antiblocking agents. Neither a slip agent nor the adsorption of slip agents at silicon dioxide is mentioned in the patent. The process described in U.S. Pat. No. 4,629,749, used for the treatment of the silicon dioxide, is very expensive and disadvantageous because of solvent emission. The PEG is preferably dissolved in acetone and mixed with the silicon dioxide. The solvent is then evaporated. Another process described therein (claim 3) consists in firstly melting the polyethylene glycol and then coating it onto the surface of the antiblocking agent. The only described way to achieve this object is given in Example VIII and, otherwise than according to claim 3, involves mixing the polyethylene glycol with the polyethylene resin which already contains antiblocking agent.

Described in FR-A-2 484 428 is the use of ethylene glycol or polyethylene glycol with precipitated silicic acid. The silicic acid is used as filler for rubber. This publication does not relate to supplying polyolefin films with antiblocking agents or the adsorption of slip agents at silicon dioxide.

The Japanese patent application JP 2 055 750 relates to a silicic acid which has either been treated with calcium stearate, paraffin wax or polyolefin wax in order to be used as antiblocking agent for polyolefin films. The silicic acid is itself merely called "finely powdered silicic acid". An adsorption of slip agent or the effect of glycols is not described.

Described in EP-A-0 442 325 is a dulling agent for coatings which is similar to the product of the present application. There is however no technological connection.

Described in EP-A-0 526 117 is a composition which contains synthetic silicon dioxide, a slip agent and an alkylene polyether (polyethylene glycol). The reduced slip agent effect is allegedly raised by adding the alkylene polyethers as "slip boosting agent", with the result that smaller quantities of slip agent suffice for the desired slip agent effect. A silicon dioxide with average pore volume is used (specific pore volume approx. 1.1 ml/g). However, although the compatibility with slip agents has been improved, the thus-treated silicon dioxide does not show adequate compatibility or a high antiblocking effect.

SUMMARY OF THE INVENTION

Compared with this, it is the object of the invention to provide an antiblocking agent with high antiblocking effect in which the aforementioned disadvantages of the state of the art as regards the adsorption of slip agent are avoided or markedly reduced, the release of the organic auxiliaries is optimized and the effectiveness of the silicon dioxide is improved. It is a further object to provide a process for the production of this antiblocking agent without disadvantageous emissions into the environment at low production costs.

This object is achieved by using a composition based on silicon dioxide as antiblocking agent which is characterized in that it contains silicon dioxide having a particle size of 2 to 8 μm (Coulter Counter), a specific surface of 150 to 850 $m^2/g$ and a specific pore volume of 1.4 to 2.0 ml/g, which has been treated with polyol.

According to the invention, an antiblocking agent based on silicon dioxide is in particular also proposed, which is characterized in that it contains silicon dioxide having a particle size of 2 to 8 μm, a specific surface of 150 to 850 m²/g and a specific pore volume of 1.4 to 2.0 ml/g, which has ben treated with ethoxylated pentaerythritol in which the pentaerythritol/ethoxy ratio lies in the range from 1:0.5 to 1:25.

Another subject of the invention is a process for the production of the antiblocking agent according to the invention which is characterized in that the silicon dioxide is micronized to a particle size of 2 to 8 μm and treated with the polyol.

DETAILED DESCRIPTION OF THE INVENTION

In contrast to the materials of this type obtainable in the trade, the silicon dioxide according to the invention or the silicic acid used according to the invention has a larger specific pore volume. It lies in the range from 1.4 to 2.0 ml/g.

The following generally applies in the range of the silica gels obtainable in the trade: gels with a smaller specific pore volume have a small pore size and a large specific surface, whilst gels with a large specific pore volume have a large pore size and a relatively small specific surface. This can be demonstrated with reference to the following examples:

TABLE I

| Trade name | Specific pore volume, ml/g | Average pore size (Wheeler*), nm | Specific surface, BET m²/g |
|---|---|---|---|
| SYLOID AL-1 | 0.4 | 2.3 | 700 |
| SYLOBLOCK 47 | 1.1 | 9.2 | 480 |

(*)Pore size (nm) = $\frac{PV\ (ml/g) \times 4000}{BET\ (m^2/g)}$

A. Wheeler in P. H. Emmet (Editor), Catalysis, Vol. 2, Reinhold, New York, 1955, page 116.

The pore volume and therefore the pore size of the silicon dioxide according to the invention are considerably different from these (see Table II).

It was surprisingly found that the treatment of the silicon dioxide according to the invention, and in particular of the silicon dioxide surface (e.g. through its impregnation) with polyol reduces the effect of the adsorption of the slip agent. This is surprising in particular because a polyol is also a polar compound. A polymer film which contains a slip agent in combination with the antiblocking agent according to the invention achieves a small and stable coefficient of friction (no "slip-stick") after extrusion much more quickly than films which contain traditional synthetic silicon dioxide antiblocking agents or those antiblocking agents which contain silicon dioxide, having an average pore volume, treated with polyethylene glycol (as described in EP-A-0 526 117).

The polyols which can be used according to the invention have at least two OH groups, preferably 3 to 5 OH groups, and chains with a molecular weight up to 2000, preferably 100 to 800. In those cases where long-chained substances are used, their molecular weight is limited by the fact that they must be liquid. Polyethylene glycols are for example also suitable.

A preferred polyol for the treatment of the silicon dioxide used is for example an alkoxylated pentaerythritol, whereby the alkoxy group is preferably a $C_1$–$C_6$ alkoxy group, and in particular is a methoxy group, ethoxy group or butoxy group. The molar ratio of pentaerythritol to the alkoxy group preferably lies in the range from 1:0.5 to 1:25, more preferably 1:1 to 1:10 and most preferably 1:1 to 1:5. A particularly preferred embodiment is ethoxylated pentaerythritol. It has in particular a mole ratio of 1:3 (pentaerythritol:ethylene oxide) and a molecular weight of 270. The overall results achieved with it are especially good.

As already stated, traditional synthetic silicon dioxide antiblocking agents have a pore volume of 0.8 to 1.2 ml/g. This means that the effectiveness is improved, compared with a non-porous material, as a result of the volume which is formed through the pores. In contrast to the silicic acids traditionally used in antiblocking agents, the silicon dioxide according to the invention does however have a pore volume of 1.4 to 2.0 ml/g which leads to an improvement of the antiblocking effect from 10 to above 80%, compared with silicon dioxides with a specific pore volume of 1.2 ml/g. In addition to the improved antiblocking effect, the larger pores of such a silicon dioxide according to the invention improve the binding of the particles to the resin. The advantage consists in the fact that the number of agglomerates and "fish eyes" is reduced. The "fish eyes" are formed when the contact between the surface of the silicon dioxide particle and the resin is lost. This can occur in the presence of high shear forces during the blowing of the film, pouring of the film or film extension.

The pore volume of the silicon dioxide is increased compared with that of known silicon dioxide by drying the silicon dioxide hydrogel (stage of the silicon dioxide production process when the pores are completely filled with water) using a process which permits high-speed drying (flash drying). Using a high-speed dryer the pre-ground particles are dried in less than 1 second and this leads to a pore volume of 1.4 to 2.0 ml/g, whilst the same silicon dioxide which has been dried in a fixed-bed dryer for a period of several minutes has a pore volume of 0.8 to 1.2 ml/g.

Treatment of the antiblocking agent with the polyol (e.g. impregnation) can advantageously take place at the same time as the grinding, for example in a jet mill. Silicon dioxide and polyol are introduced at the same time into the jet mill. This process permits the particle size to be controlled and leads to a very homogeneous distribution of the polyol on the fine silicon dioxide particles. No further production steps are required, meaning that the costs too are not further increased, and no escaping solvent has to be handled or disposed of.

The polymer additives which are protected according to the invention from an adsorption at the silicon dioxide are all those which are normally used in polyolefin films and contain polar groups. Such additives are for example fatty acid amides (erucic acid amide, oleic acid amide), antioxidants, antifogging agents and anti-static agents.

The concentration of the polyol required to prevent adsorption of slip agent at the silicon dioxide surface is 3 to 15 wt. % and preferably 6 to 10 wt. % of the silicon dioxide. It is important to note that the polyols are adsorbed very strongly at the silicon dioxide surface and do not therefore adversely influence other properties of the silicon dioxide antiblocking agent.

The particle size of the silicon dioxide is measured in suitable manner using a Coulter Counter and the pore volume is determined using nitrogen adsorption.

According to the invention, the silicon dioxide treated with polyol is used as antiblocking agent for polymer films, the films preferably being made from polyethylene, polypropylene or linear polyester, and in particular in a concentration of 200 to 4000 ppm, preferably 700 to 3000 ppm, relative to the film weight.

Other polar additives can also be present. These other polar additives are for example compounds such as erucic acid amide or oleic acid amide which are then used in concentrations of for example 200 to 4000 ppm, preferably 700 to 3000 ppm in each case. They are preferably used with polyolefins.

In general, such polar additives include antioxidants, antistatic agents, antifogging agents and UV stabilizers.

In another version which is particularly suitable in practice, the antiblocking agent or the combined antiblocking agent and slip agent is present in the form of a masterbatch, i.e. it is already incorporated in a relatively high concentration into a polymer, in particular a polyolefin. The polymer is preferably the same polymer from which the film is also comprised, into which the antiblocking agent or the combined antiblocking agent and slip agent is to be incorporated.

The concentration of the antiblocking agent or of the combined antiblocking and slip agent in the masterbatch is generally 5 to 25 wt. % or 10 to 50 wt. %.

In order to test the properties of films produced using an antiblocking agent according to the invention, the following test procedures are employed.

Test procedures

1. Deblocking resistance

Two samples measuring 10.0×7.5 $cm^2$ are cut out of the extruded film and blocked artificially for 1 hour under a pressure of 80 $g/cm^2$ at 70° C. The force necessary to separate the two film layers is measured with a Davenport Film blocking tester (Manufacturer Davenport Ltd., Great Britain).

2. Coefficients of friction

The coefficient of friction is measured according to ASTM D 1894. The "slip-stick" effect shown in the drawings can be described as an irregular, jerky movement of one film layer over the other film layer during measurement of the coefficient of friction. Normally, one film layer moves relative to the other at a constant speed and the necessarily expended force is constant. In the case of the "slip-stick" effect an irregular jerky movement of one of the film layers occurs and the measured friction force varies over a wide range (range of the "slip-stick"). The "slip-stick" effect normally happens directly after the film extrusion. It decreases after several days and depends on how quickly the slip agent can migrate to the film surface. The processor of polyolefin films quickly notices this phenomenon since it causes problems when the films are made into bags, carrier bags etc. The ideal film develops its constant coefficient of friction in a very short time after extrusion, for example within 48 hours.

3. Clouding

Clouding is measured according to ASTM D 1003.

EXAMPLES

The following examples show the effect of a larger pore volume on the antiblocking effect and the advantages of using polyol which leads to a more rapid development of a low coefficient of friction without "slip-stick".

TABLE II

| Product identification | Polyol % | Type | Wax % | Silicic acid component | | | Notes |
| | | | | Pore volume (ml/g) | BET surface ($m^2/g$) | Pore diameter (nm) | |
| --- | --- | --- | --- | --- | --- | --- | --- |
| Sylobloc 45 | — | — | — | 1.1 | 400 | 9.2 | prior art |
| Antiblocking agent 1 | — | — | — | 1.8 | 400 | 18.0 | |
| Antiblocking agent 2 | — | — | 4 | 1.8 | 400 | 18.0 | |
| Antiblocking agent 3 | 8 | PEG 400 | 4 | 1.8 | 400 | 18.0 | PEG with a molecular weight of 400 |
| Antiblocking agent 4 | 8 | ethoxylated pentaerythritol (3:1) | 4 | 1.8 | 400 | 18.0 | ethoxylated pentaerythritol (1:3) with a molecular weight of 270 |

Example 1

A LDPE masterbatch (LDPE=low-density polyethylene) with 5% antiblocking agent was produced using an internal mixer. The master-batch was added to a PP polymer (polypropylene polymer), a film extruder being used in order to obtain an antiblocking agent end-concentration of 1000, 2000 or 3000 ppm in films having a thickness of 40 μm. In each case the blocking force and the clouding of the films were determined.

Figure 1:
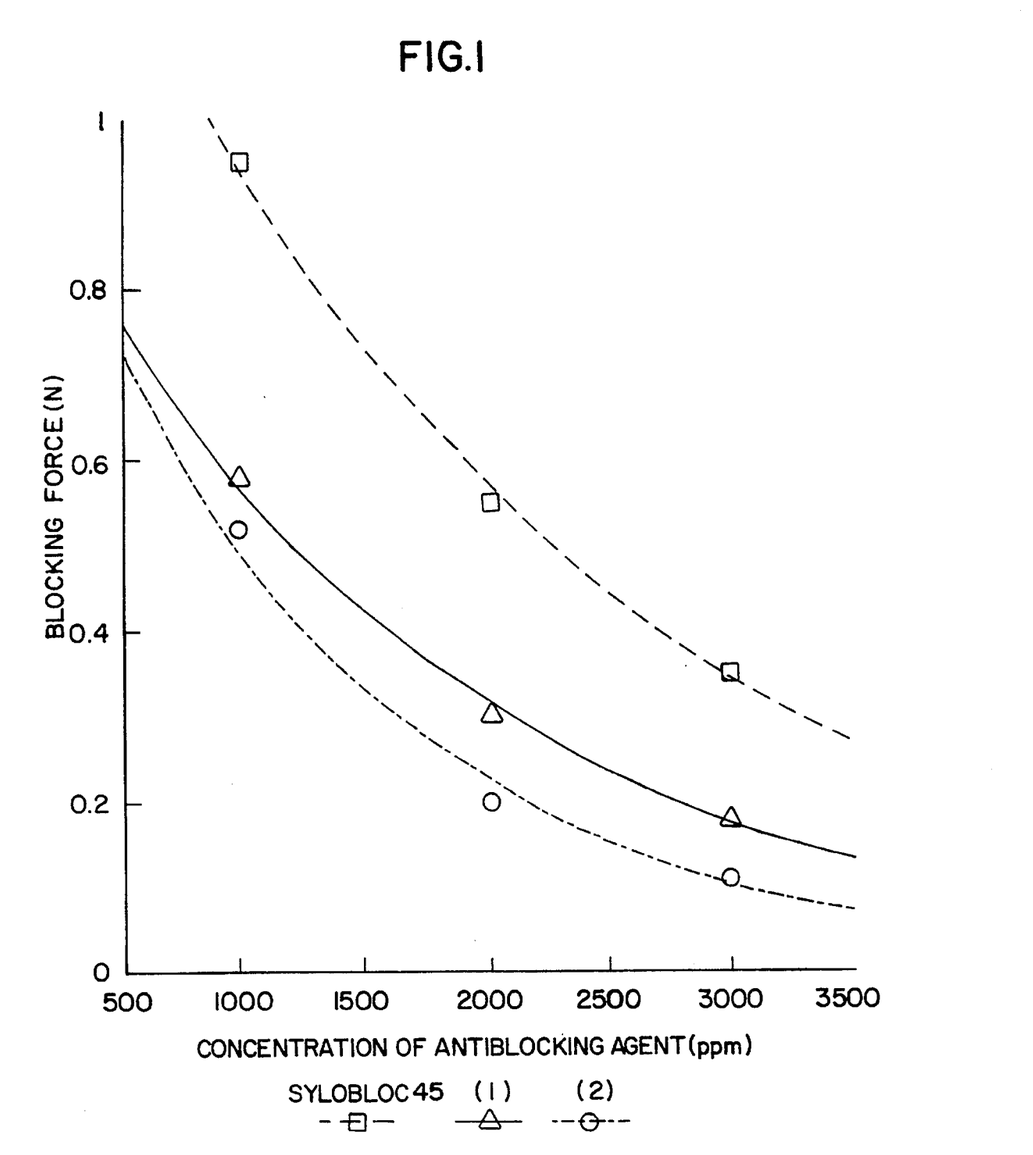
FIG. 1 is a plot of blocking force as a function of antiblocking agent concentration for films containing an antiblocking agent having the pore volume of the invention antiblocking agents compared to a conventional antiblocking agent.

It is evident from FIG. 1 that, compared with a concentration of approx. 2000 ppm of a traditional antiblocking agent having lower porosity, a concentration of only approx. 1000 ppm of the antiblocking agents according to the invention having higher porosity (1.8 ml/g) is required, 2000 ppm being the concentration of Sylobloc 45 (pore volume 1.1 ml/g) usually used in order to achieve a sufficiently low blocking force.

Figure 2:
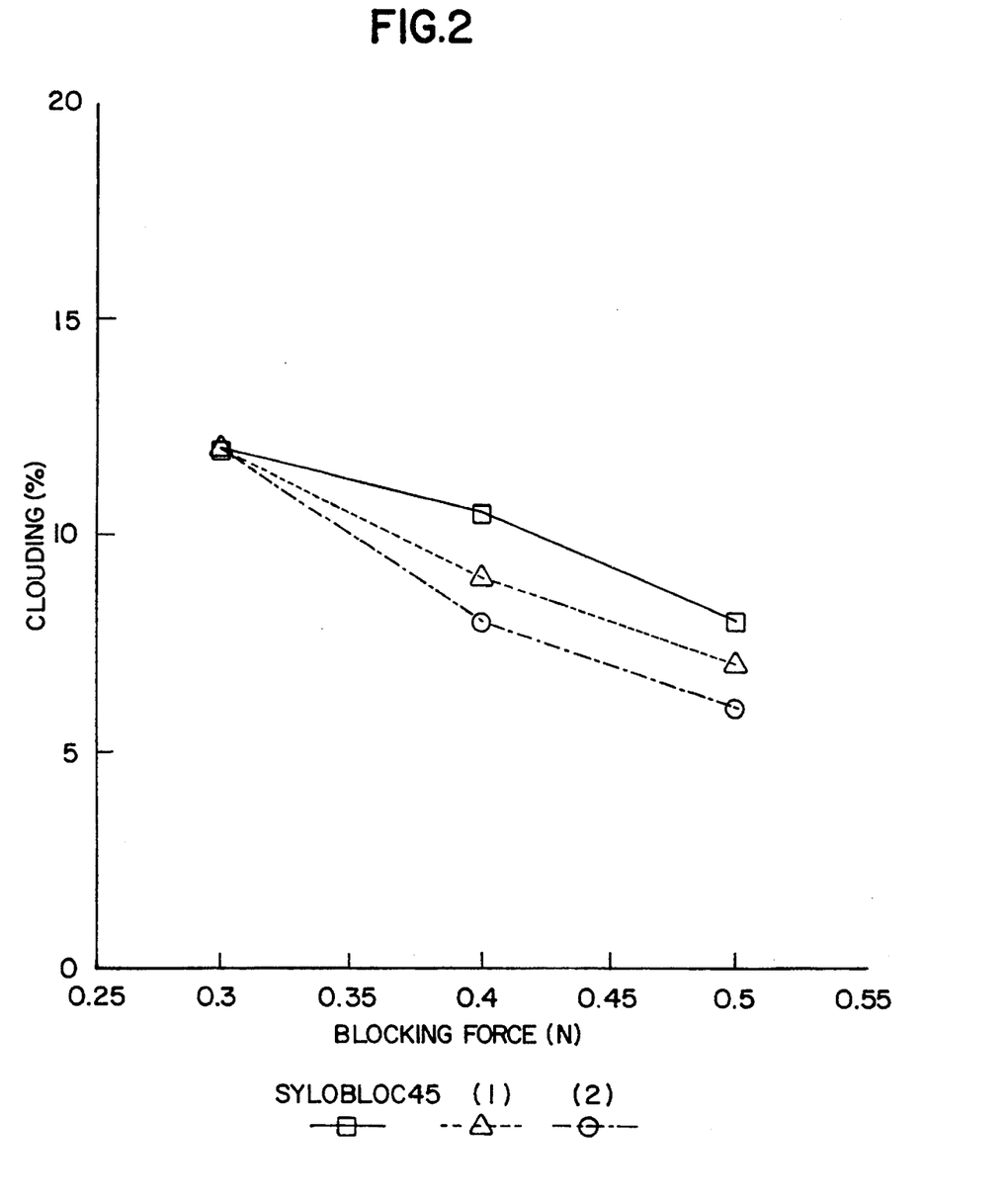
FIG. 2 is a plot of clouding as a function of blocking force for films containing an antiblocking agent having the pore volume of the invention antiblocking agents compared to a conventional antiblocking agent.

It can be seen from FIG. 2 that the clouding of the films treated with the product according to the invention is not greater, but as a rule is even less than that of a film which has been treated with Sylobloc 45, when compared at the same blocking force.

Example 2

Films were produced in the same way as in Example 1 with the antiblocking agents 2, 3 and 4 (see Table II).

Figure 3:
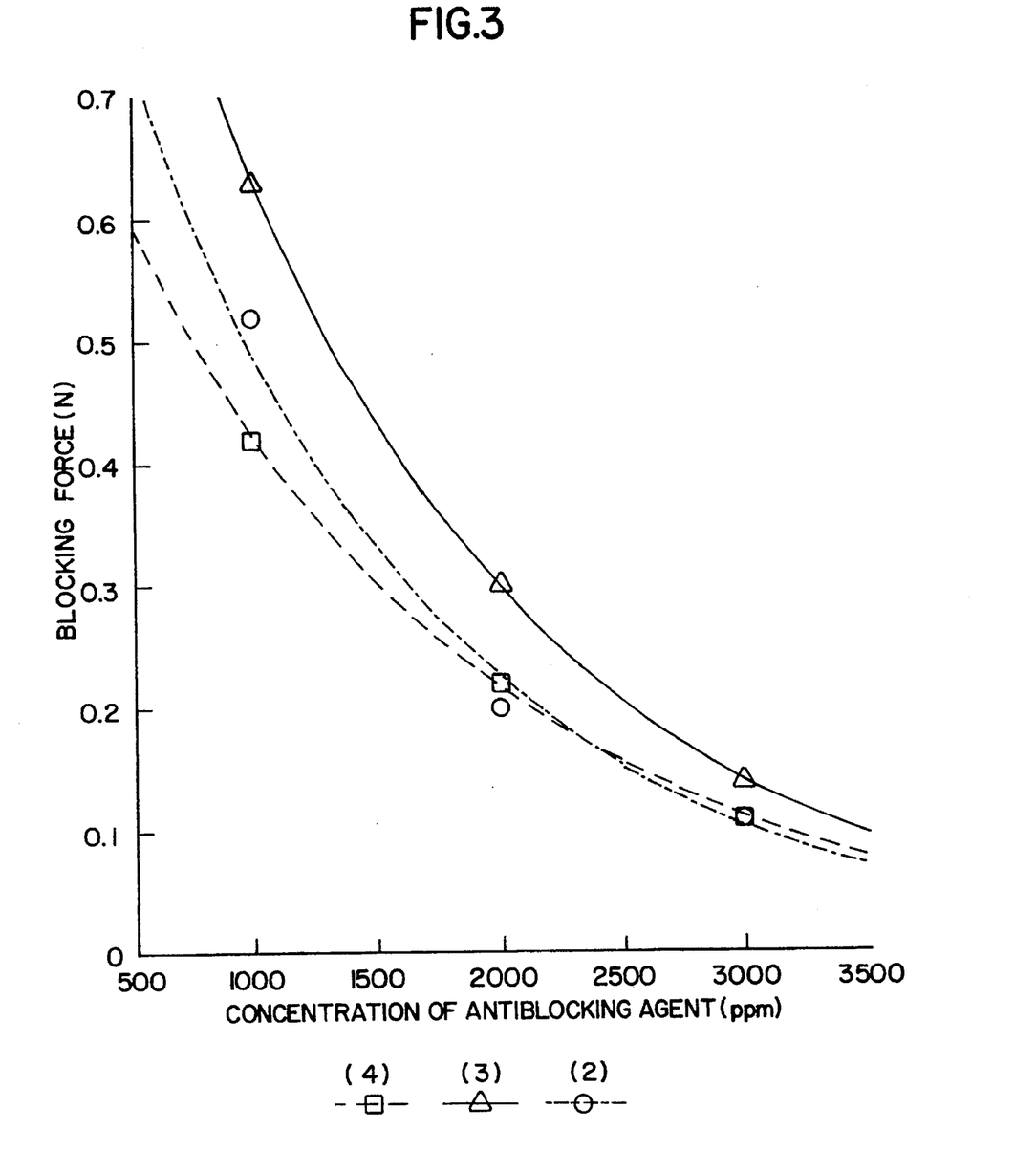
FIG. 3 is a plot of blocking force as a function of antiblocking agent concentration for films containing two polyol/wax treated antiblocking agents compared to a wax treated antiblocking agent.
Figure 4:
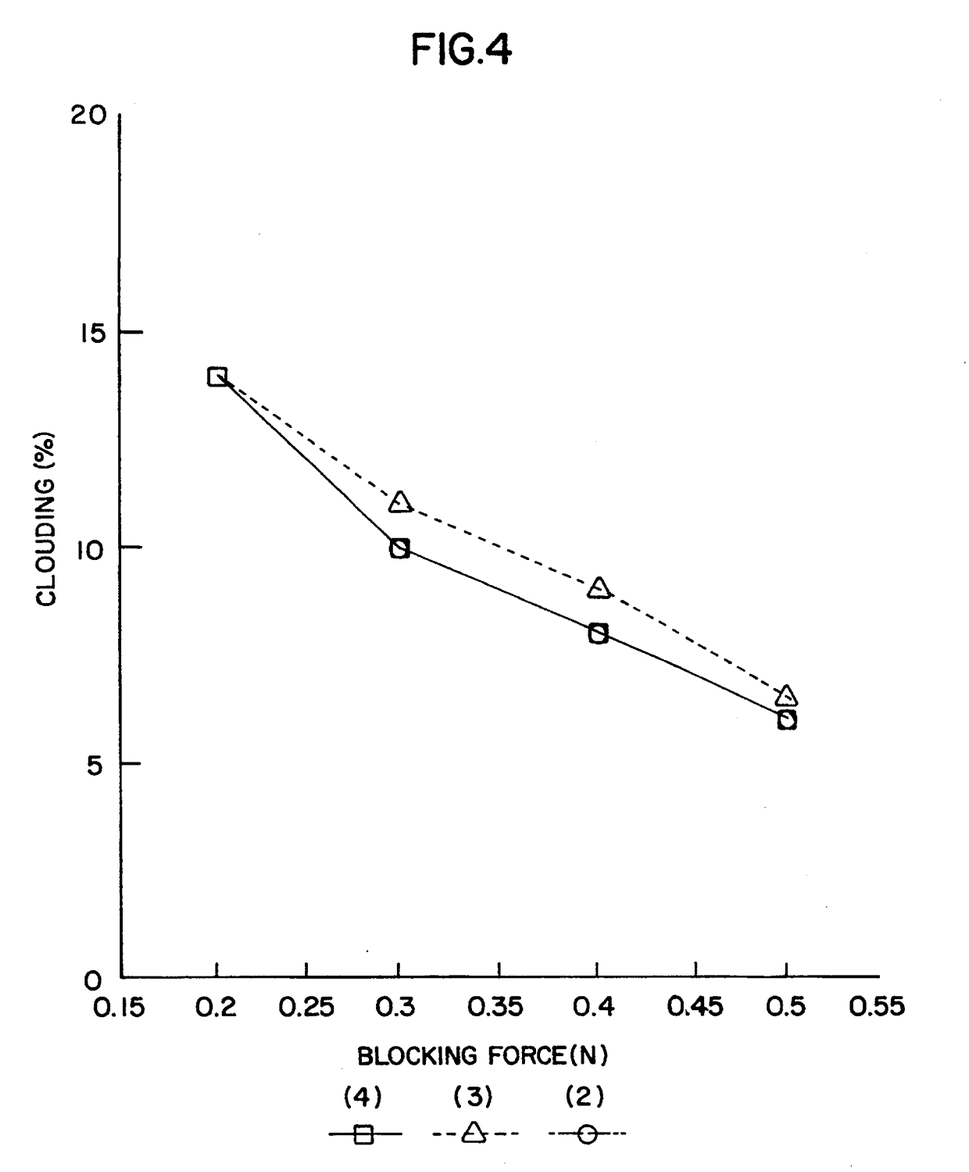
FIG. 4 is a plot of clouding as a function of blocking force for films containing two polyol/wax treated antiblocking agents compared to a wax treated antiblocking agent.

The antiblocking behaviour of these three samples is comparable with a slight disadvantage for product 3 (FIG. 3). The clouding is also approximately the same (FIG. 4).

The development of the coefficient of friction was measured for polyethylene (LDPE). For practical reasons, blocking was measured with PP films.

0.2 wt. % antiblocking agent and 0.2 wt. % oleic acid amide were incorporated into the polymer using a twin-screw mixer. Films measuring 10 cm wide and 1 mm thick were extruded from this resin. The dynamic coefficient of friction was measured after 1, 4, 7 and 10 days.

Figure 5A:
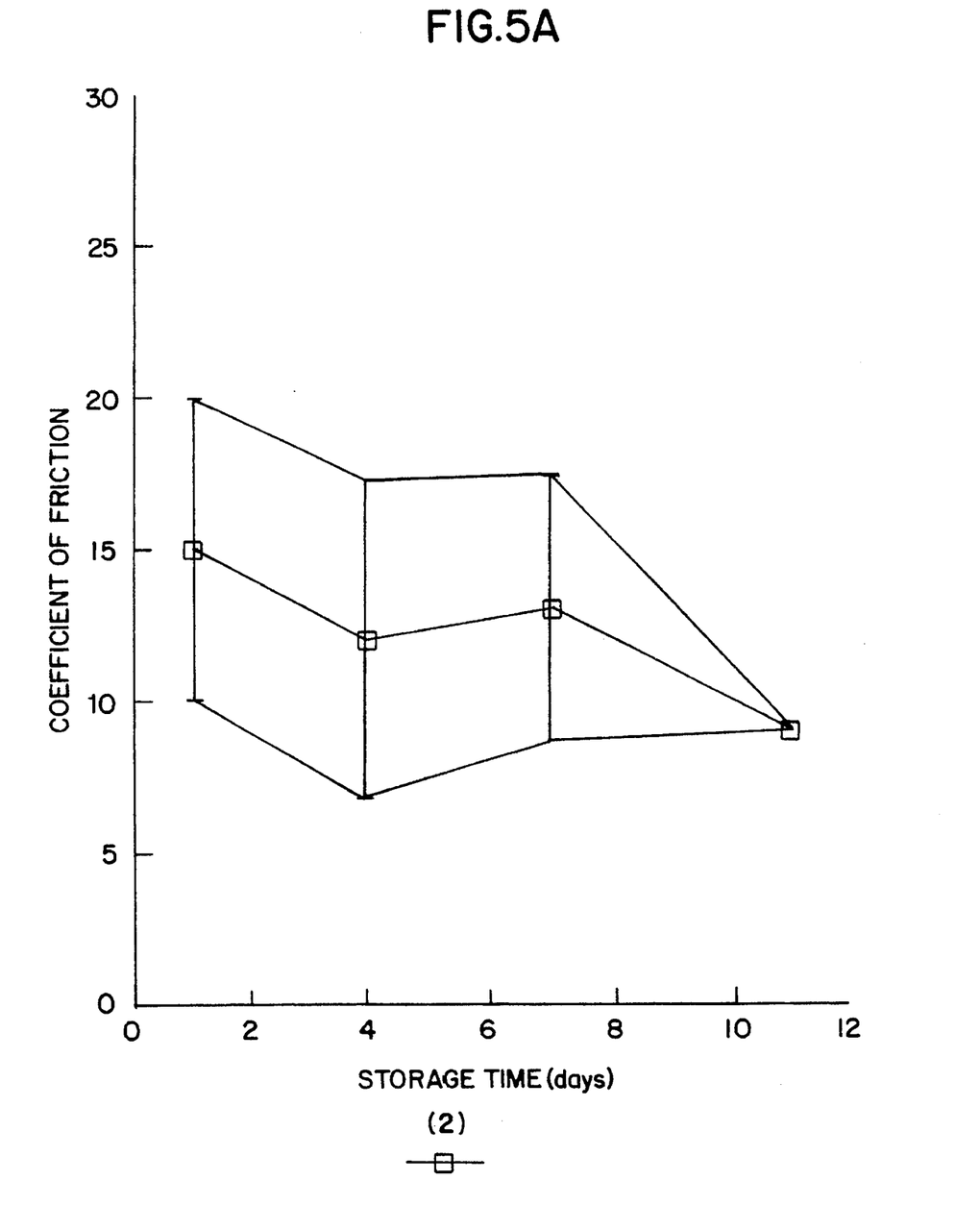
FIGS. 5A–C are plots of coefficient of friction as a function of storage time for films respectively containing wax-treated antiblocking agent, PEG/wax-treated antiblocking agent, and ethoxylated pentaerythritol/wax-treated antiblocking agent.
Figure 5B:
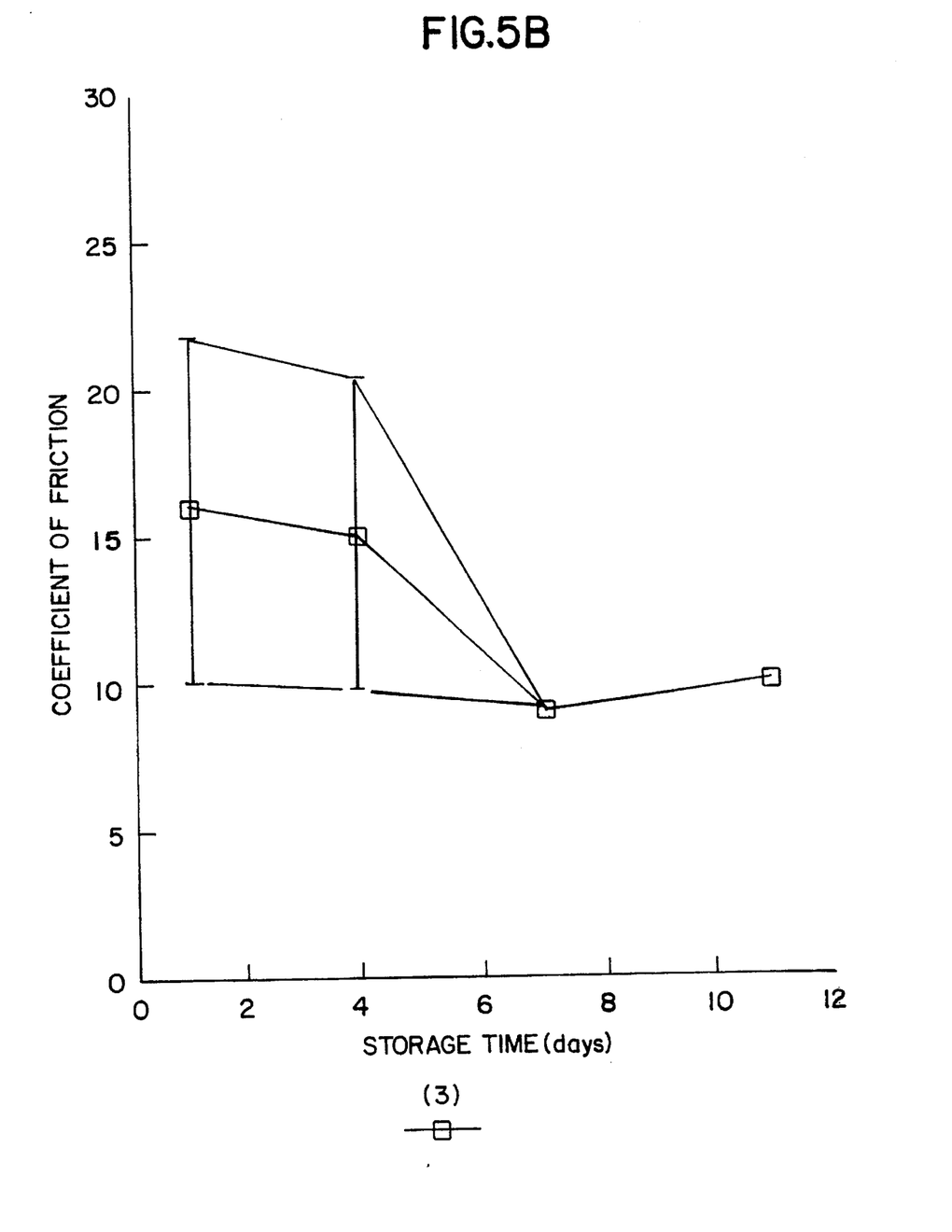
Figure 5C:
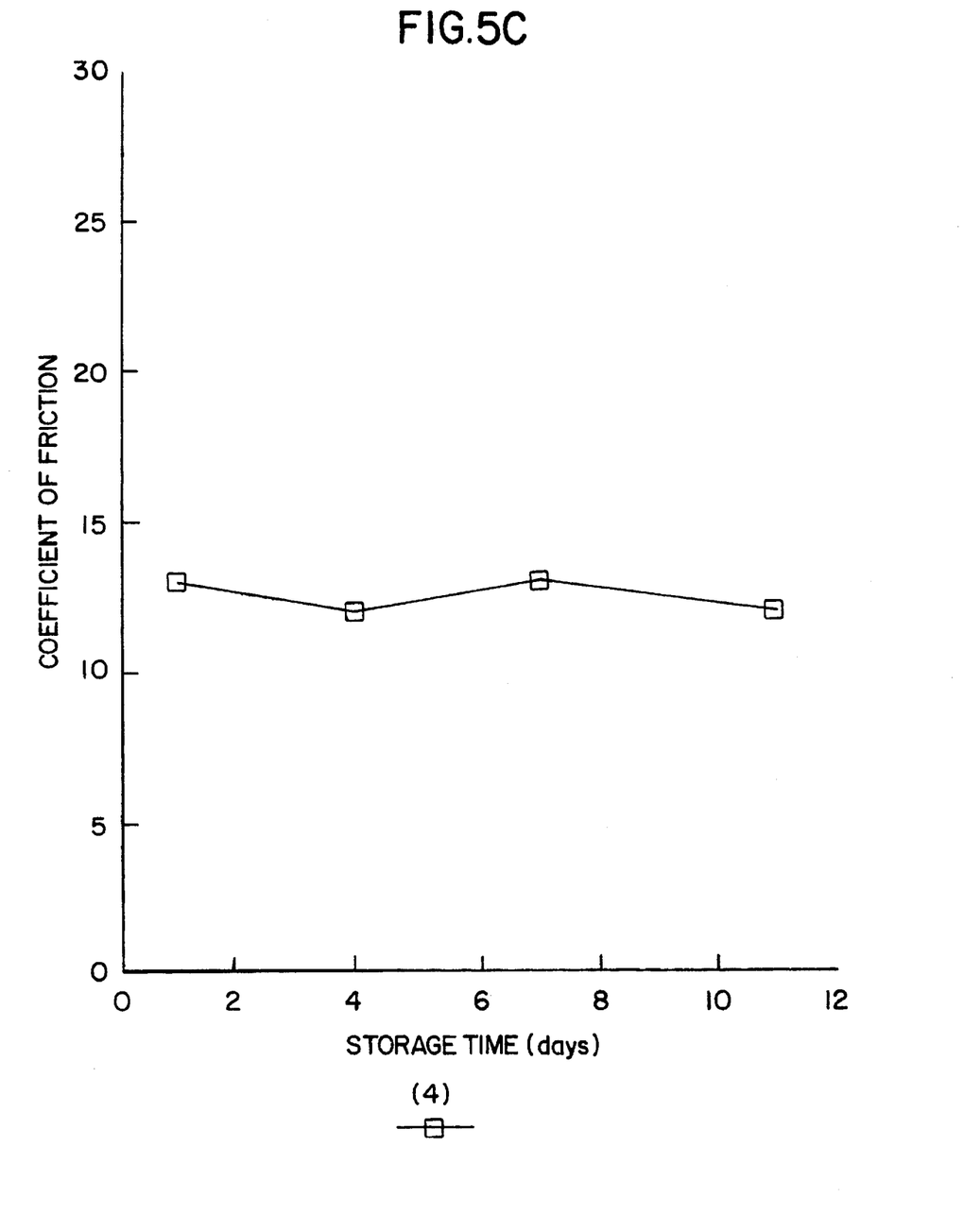

FIGS. 5A, 5B and 5C show the improved behaviour of antiblocking agent 4 which is coated with the polyol according to the invention, compared with that of antiblocking agent 3 which is coated with polyethylene glycol, or antiblocking agent 2 (untreated silicon dioxide with large pore volume). The "slip-stick" effect has disappeared after one day in the case of antiblocking agent 4, whilst in the case of the antiblocking agent 3 coated with PEG, more than four days were required, and for the silicon dioxide without polyol (antiblocking agent 2), more than 7 days were required until the "slip-stick" effect disappeared.

We claim:

1. A method of reducing blocking tendency in an extruded polymer film formed from a polymer resin composition, said method comprising adding an antiblocking agent to said composition prior to extrusion, wherein said antiblocking agent is characterized in that it contains silicon dioxide particles having a particle size of 2 to 8 μm, a specific surface area of 150 to 850 $m^2$/g and a specific pore volume of 1.4 to 2.0 ml/g, which silicon dioxide particles have been treated with 3 to 15 wt. % (based on the weight of said silicon dioxide) of polyol selected from polyols having 3 to 5 OH groups.

2. The method of claim 1 wherein said polyol is an alkoxylated pentaerythritol wherein said alkoxy group is a $C_1$–$C_6$ alkoxy group, and said polyol has a pentaerythritol:alkoxy mole ratio of 1:0.5 to 1:25.

3. The method of claim 1 wherein 200 to 4000 ppm of said antiblocking agent is added to said composition, based on the total weight of said film composition.

4. The method of claim 1 further comprising adding 200 to 4000 ppm of a slip agent to said film composition.

5. The method of claim 4 wherein said slip agent is selected from the group consisting of erucic acid amide and oleic acid amide.

6. The method of claim 1 wherein said polymer resin is selected from the group consisting of polyethylene, polypropylene, and linear polyester.

7. The method of claim 1 further comprising adding at least one polar additive selected from the group consisting of antioxidants, anti-static agents, and antifogging agents to said film composition.

8. The method of claim 4 wherein said slip agent and said antiblocking agent are combined together prior to addition to said polymer film composition.

9. The method of claim 1 wherein said antiblocking agent is first incorporated into a masterbatch of said polymer resin, which masterbatch is then combined with an additional amount of said polymer resin to form said polymer film composition.

10. The method of claim 1 wherein a slip agent is also incorporated into said masterbatch and said masterbatch contains a combined total of about 10 to 50 wt. % of said antiblocking agent and said slip agent.

11. An extruded polymer film comprising a polymer resin and an antiblocking agent wherein said antiblocking agent is characterized in that it contains silicon dioxide particles having a particle size of 2 to 8 μm, a specific surface area of 150 to 850 $m^2$/g and a specific pore volume of 1.4 to 2.0 ml/g, which silicon dioxide particles have been treated with 3 to 15 wt. % (based on the weight of said silicon dioxide) of polyol selected from polyols having 3 to 5 OH groups.

12. The polymer film of claim 11 wherein said polyol is an alkoxylated pentaerythritol wherein said alkoxy group is a $C_1$–$C_6$ alkoxy group, and said polyol has a pentaerythritol:alkoxy mole ratio of 1:0.5 to 1:25.

13. The polymer film composition of claim 11 wherein said film contains 200 to 4000 ppm of said antiblocking agent, based on the total weight of said film.

14. The polymer film composition of claim 11 wherein said film further comprises 200 to 4000 ppm of a slip agent.

15. The polymer film composition of claim 14 wherein said slip agent is selected from the group consisting of erucic acid amide and oleic acid amide.

16. The polymer film composition of claim 11 wherein said polymer resin is selected from the group consisting of polyethylene, polypropylene, and linear polyester.

17. The polymer film of claim 11 wherein said film further comprises at least one polar additive selected from the group consisting of antioxidants, anti-static agents, and antifogging agents.

* * * * *